United States Patent
Ichikawa et al.

(10) Patent No.: US 9,764,990 B2
(45) Date of Patent: Sep. 19, 2017

(54) HONEYCOMB STRUCTURE

(71) Applicant: NGK Insulators, Ltd., Nagoya (JP)

(72) Inventors: Shuichi Ichikawa, Nagoya (JP); Atsushi Mizuno, Nagoya (JP); Yukio Miyairi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 359 days.

(21) Appl. No.: 14/592,286

(22) Filed: Jan. 8, 2015

(65) Prior Publication Data
US 2015/0259254 A1    Sep. 17, 2015

(30) Foreign Application Priority Data
Mar. 12, 2014 (JP) ................................. 2014-049340

(51) Int. Cl.
*C04B 35/00* (2006.01)
*F01N 3/022* (2006.01)
(Continued)

(52) U.S. Cl.
CPC ...... *C04B 38/0009* (2013.01); *B01D 46/2418* (2013.01); *C04B 35/565* (2013.01); *C04B 35/584* (2013.01); *C04B 35/6303* (2013.01); *C04B 35/6316* (2013.01); *C04B 38/0019* (2013.01); *F01N 3/0222* (2013.01); *C04B 2111/0081* (2013.01);
(Continued)

(58) Field of Classification Search
None
See application file for complete search history.

(56) References Cited

U.S. PATENT DOCUMENTS

| 2003/0134084 A1 | 7/2003 | Ichikawa et al. |
| 2003/0148063 A1 | 8/2003 | Morimoto et al. |
(Continued)

FOREIGN PATENT DOCUMENTS

| JP | 06-182228 A1 | 7/1994 |
| JP | 2002-201082 A1 | 7/2002 |
(Continued)

OTHER PUBLICATIONS

Extended European Search Report (Application No. 15150750.6) dated Nov. 19, 2015.
(Continued)

*Primary Examiner* — David Sample
*Assistant Examiner* — Nicholas W Jordan
(74) *Attorney, Agent, or Firm* — Burr & Brown, PLLC (57) ABSTRACT

A honeycomb structure includes a honeycomb structure body having a partition wall which is constituted of a porous body. The porous body includes a refractory aggregate and a bonding material. The porous body constituting includes the bonding material at a mass proportion of 20 to 35 mass %. In an observation of a cross section of the partition wall with an electron microscope, when observing any given ten visual fields meeting a following condition (1), the number of refractory aggregates meeting a following condition (2) is five pieces or more in all of the ten visual fields.
Condition (1): a proportion of an area occupied by the bonding material is 30% or more.
Condition (2): the refractory aggregate has a particle diameter of 5 μm or more, and 60% or more of an outer circumference of the refractory aggregate is surrounded by the bonding material.

16 Claims, 5 Drawing Sheets

(51) Int. Cl.

| | |
|---|---|
| *C04B 38/00* | (2006.01) |
| *C04B 35/565* | (2006.01) |
| *C04B 35/584* | (2006.01) |
| *B01D 46/24* | (2006.01) |
| *C04B 35/63* | (2006.01) |
| *C04B 111/00* | (2006.01) |

(52) U.S. Cl.
CPC .............. *C04B 2111/00793* (2013.01); *C04B 2235/3206* (2013.01); *C04B 2235/3217* (2013.01); *C04B 2235/3218* (2013.01); *C04B 2235/3229* (2013.01); *C04B 2235/349* (2013.01); *C04B 2235/3418* (2013.01); *C04B 2235/3826* (2013.01); *C04B 2235/3873* (2013.01); *C04B 2235/5409* (2013.01); *C04B 2235/5436* (2013.01); *C04B 2235/5472* (2013.01); *C04B 2235/786* (2013.01); *C04B 2235/80* (2013.01); *C04B 2235/96* (2013.01); *Y10T 428/24149* (2015.01)

(56) References Cited

U.S. PATENT DOCUMENTS

| | | |
|---|---|---|
| 2004/0033893 A1 | 2/2004 | Tomita et al. |
| 2004/0266617 A1 | 12/2004 | Fujii et al. |
| 2006/0029768 A1 | 2/2006 | Furukawa et al. |
| 2008/0057268 A1 | 3/2008 | Lu et al. |
| 2014/0370232 A1 | 12/2014 | Izumi et al. |
| 2014/0370233 A1 | 12/2014 | Izumi et al. |

FOREIGN PATENT DOCUMENTS

| | | |
|---|---|---|
| JP | 2003-154264 A1 | 5/2003 |
| JP | 4307781 B2 | 8/2009 |
| JP | 4426459 B2 | 3/2010 |
| WO | 2008/027423 A2 | 3/2008 |
| WO | 2013/146953 A1 | 10/2013 |
| WO | 2013/146954 A1 | 10/2013 |

OTHER PUBLICATIONS

Japanese Office Action (Application No. 2014-049340) dated Jul. 4, 2017 (with English translation).

FIG.7

HONEYCOMB STRUCTURE

The present application is an application based on JP 2014-049340 filed on Mar. 12, 2014 with Japan Patent Office, the entire contents of which are incorporated herein by reference.

BACKGROUND OF THE INVENTION

Field of the Invention

The present invention relates to a honeycomb structure. More specifically, the present invention relates to a honeycomb structure that can be preferably used as a filter and a catalyst carrier for purifying vehicle exhaust gas.

There has widely been used a porous honeycomb structure as a filter for trapping and removing a particulate matter contained in a dust-containing fluid such as a diesel engine exhaust gas or as a catalyst carrier for loading a catalyst component for purifying harmful substances in exhaust gas. In addition, it is known that refractory particles such as silicon carbide (SiC) particles are used as a constituent material for such a honeycomb structure.

For example, as a catalyst carrier using the honeycomb structure, there is disclosed a honeycomb-structured porous silicon carbide catalyst carrier obtained by using a silicon carbide powder as a starting raw material, molding the material into a desired shape, drying the material, and firing the material in a temperature range of 1600 to 2200° C. (for example, see Patent Document 1). There is disclosed a honeycomb structure that includes a lot of flow holes. The flow holes are separated from each other by a partition wall and penetrate in an axial direction. The honeycomb structure contains refractory particles and metallic silicon serving as an aggregate and is porous (see, for example, Patent Document 2). In the honeycomb structure containing the refractory particle and the metallic silicon, which become the aggregate, the silicon carbide is especially used as the refractory particles.

The honeycomb structure containing the silicon carbide as the aggregate has a problem of insufficient wettability between the silicon carbide (SiC) and the metallic silicon (Si). Accordingly, the honeycomb structure cannot be formed to have high strength. The above-described honeycomb structure has insufficient thermal conductivity. This generates a large temperature grade for use at high temperatures. This also causes a problem that the honeycomb structure is likely to be broken by thermal stress. In view of this, there is proposed techniques that improve the wettability between silicon carbide and metallic silicon by adding an alkaline earth metal assistant to a raw material for fabricating a honeycomb structure (for example, see Patent Documents 3 and 4). According to the techniques, the improvement of the above-described wettability increases an interface area between the silicon carbide and the metallic silicon. Thus, high strength and high thermal conductivity of materials constituting the honeycomb structure are ensured. It is disclosed that the techniques can inhibit a damage of these materials under a usage environment of the filter and the catalyst carrier.

[Patent Document 1] JP-A-H6-182228
[Patent Document 2] JP-A-2002-201082
[Patent Document 3] JP-B2-4307781
[Patent Document 4] JP-B2-4426459

SUMMARY OF THE INVENTION

According to the techniques disclosed in Patent Documents 3 and 4, the wettability between the silicon carbide and the metallic silicon can be improved to some extent. However, the improvement on wettability is limited to a material that bonds the silicon carbide with the metallic silicon. This also has a problem of failing to obtain sufficient effect actually. That is, development of the following honeycomb structure has been highly demanded. The honeycomb structure has high strength and high thermal conductivity. Further, the honeycomb structure is made of a material that is less likely to be damaged even for usage under high-temperature environment.

The present invention has been developed in view of the above-mentioned problems, and its object is to provide a honeycomb structure that has high strength and high thermal conductivity. Further, the honeycomb structure is made of a material that is less likely to be damaged even for usage under high-temperature environment.

To solve the above-mentioned problems, according to the present invention, the following honeycomb structure is provided.

According to a first aspect of the present invention, a honeycomb structure includes a columnar honeycomb structure body that has a partition wall is provided. The partition wall defines a plurality of cells. The cells extend from a first end face to a second end face and become channels for fluid. The partition wall is constituted of a porous body. The porous body includes a refractory aggregate and a bonding material. The bonding material has a main constituent of an oxide material. The bonding material bonds the refractory aggregates. The porous body constituting the partition wall includes the bonding material at a mass proportion of 20 to 35 mass %. In an observation of a cross section of the partition wall perpendicular to the cell extending direction of the honeycomb structure body with an electron microscope, when observing any given ten visual fields meeting a following condition (1), the number of refractory aggregates meeting a following condition (2) is five pieces or more in all of the ten visual fields.

Condition (1): the visual field is 100 μm square, and in the visual field, a proportion of an area occupied by the bonding material to a total area of the refractory aggregate and the bonding material in the visual field is 30% or more.

Condition (2): the refractory aggregate has a particle diameter of 5 μm or more, and 60% or more of an outer circumference of the refractory aggregate is surrounded by the bonding material.

According to a second aspect of the present invention, the honeycomb structure according to the first aspect is configured as follows. The bonding material has a main constituent of: an oxide made of metal of at least one kind selected from the group consisting of Al, Si, and Mg; or a mixture of the oxides.

According to a third aspect of the present invention, the honeycomb structure according to the first or second aspects is configured as follows. In an observation of the cross section of the partition wall perpendicular to the cell extending direction of the honeycomb structure body with the electron microscope, when observing any given ten visual fields meeting the condition (1), the number of refractory aggregates meeting the condition (2) is seven pieces or more.

According to a fourth aspect of the present invention, the honeycomb structure according to any one of the first to third aspects is configured as follows. In an observation of a cross section of the partition wall perpendicular to the cell extending direction of the honeycomb structure body with an electron microscope, when observing any given ten visual fields meeting a following condition (3), the number of refractory aggregates meeting the condition (2) is five pieces or more.

Condition (3): the visual field is 70 μm square, and in the visual field, a proportion of an area occupied by the bonding material to a total area of the refractory aggregate and the bonding material in the visual field is 30% or more.

According to a fifth aspect of the present invention, the honeycomb structure according to any one of the first to fourth aspects is configured as follows. The refractory aggregate includes silicon carbide particles or silicon nitride particles.

The honeycomb structure of present invention includes a honeycomb structure body that has a partition wall. The partition wall is constituted of the porous bodies. The porous body includes the refractory aggregate and the bonding material. The main constituent of the bonding material is the oxide material. The bonding material bonds the refractory aggregates. In the honeycomb structure of the present invention, in the observation of the cross section of the partition wall with the electron microscope, when observing any given ten visual fields meeting the condition (1), the number of refractory aggregates meeting the condition (2) is five pieces or more in all of these ten visual fields. The honeycomb structure of the present invention features high strength of the porous bodies, which constitute the partition wall, and also high thermal conductivity of this porous body. Further, the honeycomb structure also provides an effect of being less likely to be damaged in usage under high temperature environment. That is, according to the present invention, the bond neck portion, in which the refractory aggregates are bonded to each other by the bonding material, thickens. This improves the strength of the porous bodies constituting the partition wall. The honeycomb structure of the present invention also provides an effect of low pressure loss. That is, the number of refractory aggregates meeting the condition (2) is five pieces or more. Accordingly, a pore formed in the porous bodies, which constitute the partition wall, likely to be a communication hole communicating from one surface to the other surface of this partition wall. This reduces both of an initial pressure loss and pressure loss when PM deposits. The initial pressure loss is pressure loss after coating a catalyst for purifying exhaust gas to the partition wall of the honeycomb structure. The pressure loss when PM deposits is pressure loss when PM, such as soot, deposits on a surface of the partition wall.

DETAILED DESCRIPTION OF THE PRESENT INVENTION

Next, a mode for carrying out the present invention will be described in detail with reference to the drawings. It should be understood that the present invention is not limited to the following embodiments and that design change, improvement, or a similar change may be suitably added on the basis of ordinary knowledge of a person skilled in the art without departing from the gist of the present invention.

Figure 1:
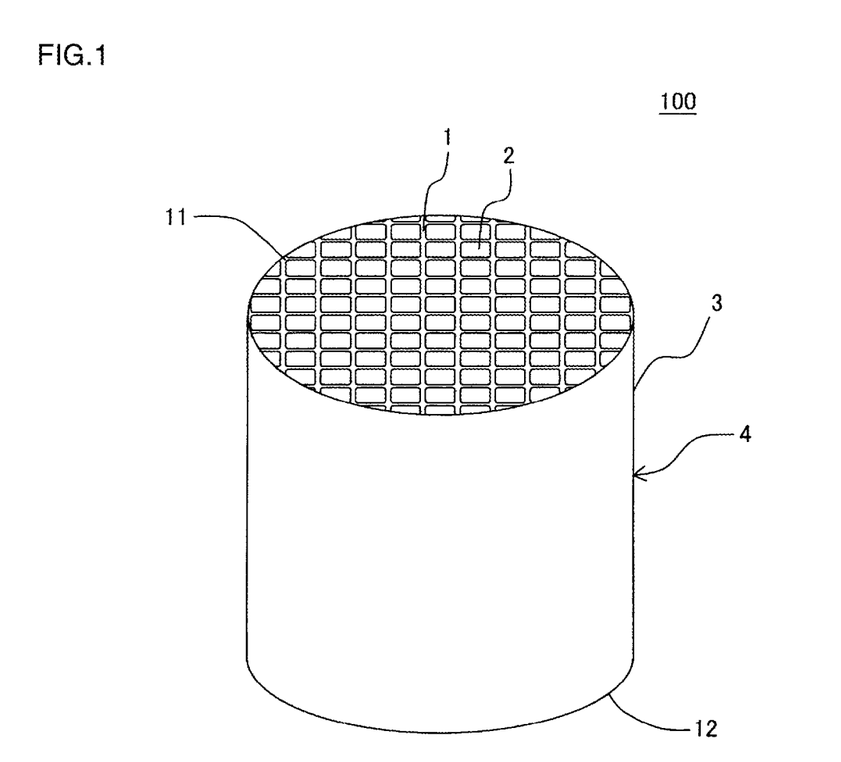
FIG. 1 is a schematic perspective view when a honeycomb structure of one embodiment of the present invention is viewed from an inflow end face side.
Figure 2:
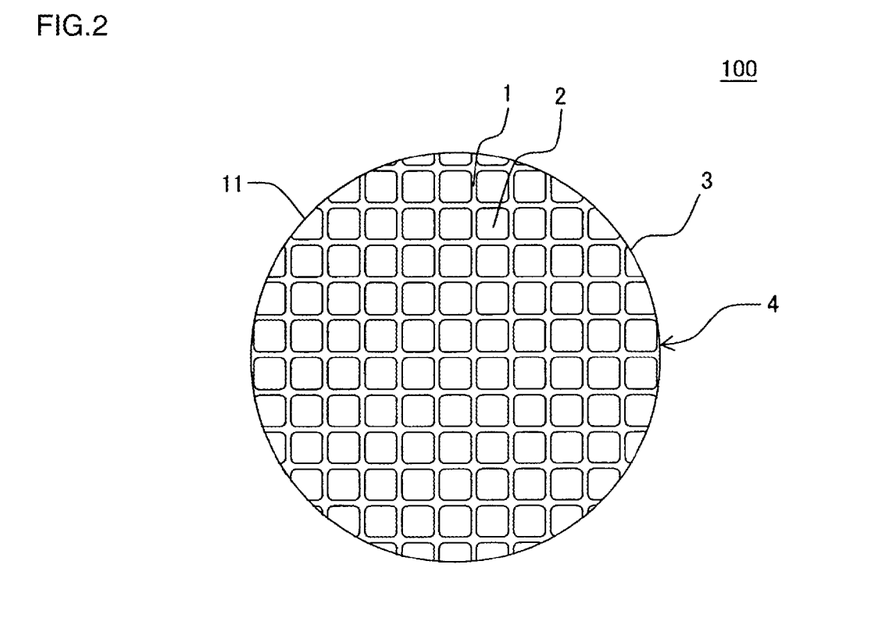
FIG. 2 is a schematic plan view when the honeycomb structure shown in FIG. 1 is viewed from the inflow end face side.
Figure 3:
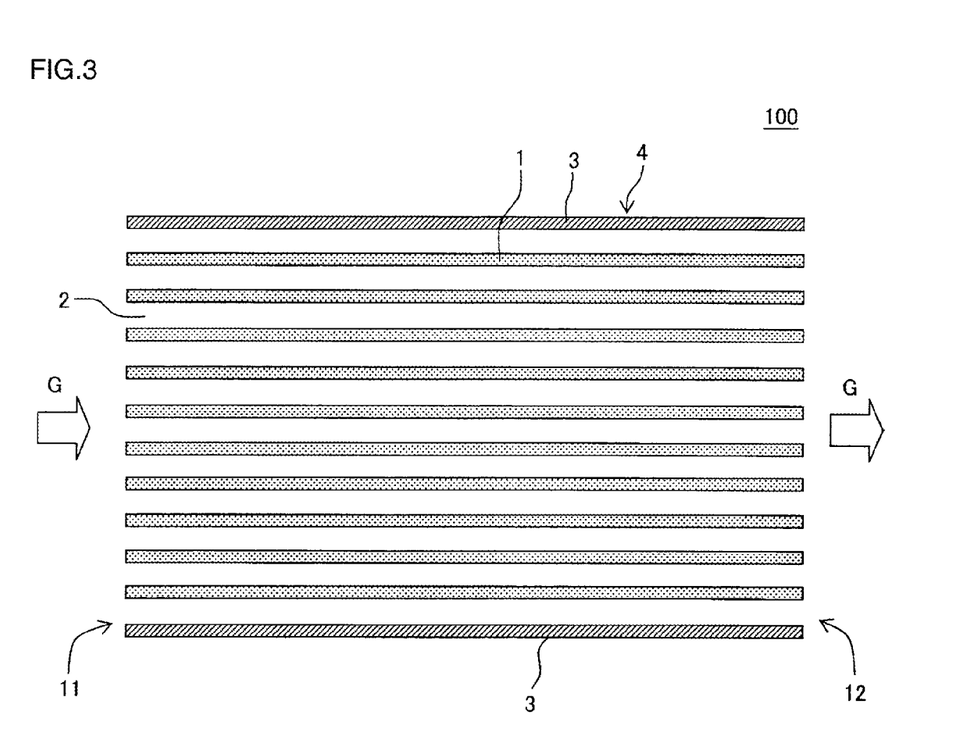
FIG. 3 is a schematic cross-sectional view showing a cross section parallel to a cell extending direction of the honeycomb structure shown in FIG. 1.

(1) Honeycomb Structure:

One embodiment of the honeycomb structure of the present invention is a honeycomb structure 100 as shown in FIG. 1 to FIG. 3. The honeycomb structure 100 includes a columnar-shaped honeycomb structure body 4. The honeycomb structure body 4 has a partition wall 1. The partition wall 1 defines a plurality of cells 2. The plurality of cells 2 extend from a first end face 11 to a second end face 12 and become channels for fluid. Here, FIG. 1 is a schematic perspective view when a honeycomb structure of one embodiment of the present invention is viewed from an inflow end face side. FIG. 2 is a schematic plan view when the honeycomb structure shown in FIG. 1 is viewed from the inflow end face side. FIG. 3 is a schematic cross-sectional view showing a cross section parallel to a cell extending direction of the honeycomb structure shown in FIG. 1. The honeycomb structure 100 shown in FIG. 1 to FIG. 4 further has a circumferential wall 3. The circumferential wall 3 is positioned at an outermost circumference of the honeycomb structure body 4.

Figure 4:
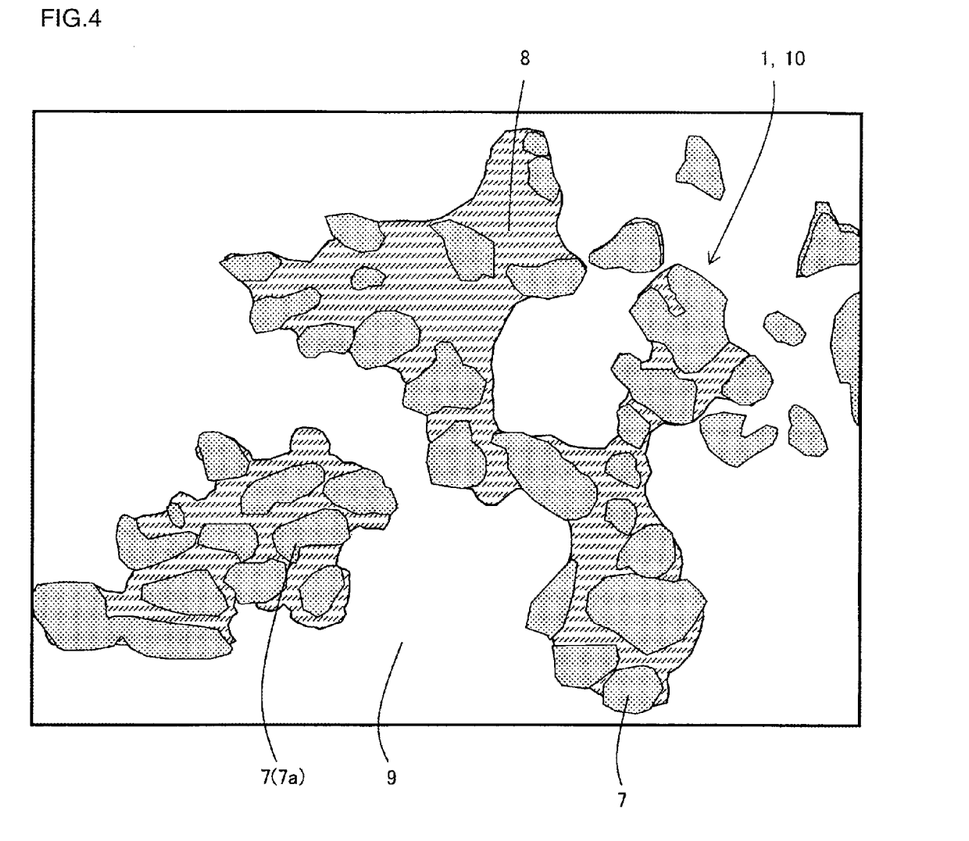
FIG. 4 schematically shows an image of a cross section of a partition wall of the honeycomb structure of the present invention obtained by observation with an electron microscope.

In the honeycomb structure 100 of this embodiment, the partition wall 1 of the honeycomb structure body 4 is formed of porous bodies 10 as shown in FIG. 4. The porous body 10 includes a refractory aggregate 7 and a bonding material 8. The main constituent of the bonding material 8 is an oxide material that bonds these refractory aggregates 7. FIG. 4 schematically shows an image of a cross section of the partition wall of the honeycomb structure of the present invention obtained by observation with an electron microscope. The honeycomb structure of this embodiment features a constitution of the refractory aggregate 7 and the bonding material 8 in observing the cross section of the partition wall 1 perpendicular to the cell 2 (see FIG. 3) extending direction of the honeycomb structure body 4 (see FIG. 3) as shown in FIG. 4 with an electron microscope. Specifically, first, the porous bodies 10, which constitute the partition wall 1, contain the bonding material 8 at a mass proportion of 20 to 35 mass %. Second, when observing any given ten visual fields meeting the following condition (1) by the above-described observation with the electron microscope, in all of these ten visual fields, the number of refractory aggregates 7a meeting the following condition (2) is five pieces or more.

Condition (1): the visual field is 100 μm square, and in the visual field, a proportion of an area occupied by the bonding materials 8 to a total area of the refractory aggregates 7 and the bonding materials 8 in this visual field is 30% or more.

Condition (2): the refractory aggregate 7 has a particle diameter of 5 μm or more, and 60% or more of an outer circumference of the refractory aggregate 7a is surrounded by the bonding material 8.

The honeycomb structure of this embodiment has the following effects. The porous bodies 10, which constitute the partition wall 1, have high strength. A thermal conductivity of these porous bodies 10 is also high. Further, the porous body 10 is less likely to be damaged for usage under high-temperature environment. That is, a bond neck portion, in which the refractory aggregates 7 are bonded to each other by the bonding material 8, thickens. This improves the strength of the porous bodies 10 constituting the partition wall 1. The honeycomb structure of this embodiment also provides an effect of low pressure loss. That is, the number of refractory aggregates 7a meeting the condition (2) is five pieces or more. Accordingly, a pore 9 formed in the porous bodies 10, which constitute the partition wall 1, is likely to be a communication hole communicating from one surface to the other surface of this partition wall 1. This reduces both of an initial pressure loss and pressure loss when PM deposits. The initial pressure loss is pressure loss after coating a catalyst for purifying exhaust gas to the partition wall 1 of the honeycomb structure. The pressure loss when PM deposits is pressure loss when PM, such as soot, deposits on a surface of the partition wall 1. Hereinafter, this description may describe the "refractory aggregate" simply as the "aggregate."

With the honeycomb structure of this embodiment, if the mass proportion of the bonding materials 8 contained in the porous body 10 is less than 20 mass %, bonding between the aggregates becomes insufficient. Accordingly, sufficient material strength does not appear. On the other hand, the mass proportion of the bonding materials 8 contained in the porous body 10 of more than 35 mass % degrades the thermal conductivity. The mass proportion of the bonding materials 8 contained in the porous body 10 is further preferable to be 25 to 35 mass %. The mass proportion of the bonding materials 8 contained in the porous body 10 is a percentage of a proportion of a mass of the bonding materials 8 with respect to the total mass of the refractory aggregates 7 and the bonding materials 8, which constitute the porous body 10. The mass proportion of the bonding materials 8 contained in the porous body 10 can be measured by the following method. First, a total mass of a material test specimen cut out from the partition wall of the honeycomb structure is measured. Meanwhile, an image of the material test specimen is taken with a scanning electron microscope. From the obtained SEM image, an area proportion of a region of the aggregate in this SEM image is obtained. Then, the mass proportion of the aggregate is obtained from the obtained area proportion of the aggregate region and the known aggregate particle density. The remainder in the material test specimen excluding the aggregate is the bonding material. From the total mass of the material test specimen and the mass proportion of the aggregate, the mass proportion of the bonding material is obtained.

With the honeycomb structure of this embodiment, when any given ten visual fields meeting the condition (1) are observed by the observation with the electron microscope, in all of these ten visual fields, the number of refractory aggregates 7a meeting the condition (2) is five pieces or more. If the number of refractory aggregates 7a meeting the condition (2) is less than five pieces, the strength of the porous body 10 is degraded, also increasing the pressure loss. The number of refractory aggregates 7a meeting the condition (2) is preferable to be seven pieces or more, further preferable to be 7 to 20 pieces, and especially preferable to be 10 to 20 pieces. The refractory aggregate 7a meeting the condition (2) has the particle diameter of 5 μm or more. Accordingly, the number of pieces observed in the above-described visual fields has an upper limit. The actual upper limit value in consideration of the mass proportion of the bonding materials 8 contained in the porous body 10 is 20 pieces. The refractory aggregate 7 whose particle diameter is less than 5 μm gives comparatively small influence to improvement of the strength of the porous body 10. Accordingly, one requirement of the condition (2) is that the refractory aggregate 7 has the particle diameter of 5 μm or more.

Hereinafter, this description may describe the "cell extending direction of the honeycomb structure body" simply as the "cell extending direction." Unless otherwise noted, in this description, the "cross section" means the "cross section perpendicular to the cell extending direction of the honeycomb structure body." In this description, the "observation with the electron microscope" means an observation of the cross section of the honeycomb structure body with the electron microscope. In particular, the "observation with the electron microscope" means observation with a scanning electron microscope (SEM). The following may describe a photograph taken by the observation with the electron microscope as an "SEM photograph." The following may describe an image captured in this SEM photograph as an "SEM image."

In this description, the "main constituent" means a constituent occupying 90 mass % or more in each constituent element. That is, with the honeycomb structure of this embodiment, 90 mass % or more of the bonding material contained in the porous body is an oxide material. The main constituent is preferable to be a constituent contained by 95 mass % or more in the constituent element, further preferable to be a constituent contained by 98 mass % or more.

(1-1) Observation with Electron Microscope:

The observation with the electron microscope on the cross section of the partition wall of the honeycomb structure of this embodiment perpendicular to the cell extending direction of the honeycomb structure body can be performed by the following method. First, from the honeycomb structure, a cubic sample for the observation with the electron microscope is cut out at 5 mm square size for fabrication. This sample is fabricated such that the cross section of the partition wall is viewable at the surface of the cut out cube. Next, the obtained sample is buried with resin and is hardened. Then, the surface of the sample is polished. Next, an SEM photograph of a portion of the surface of the sample where the cross section of the partition wall appears is taken with a magnification power of 400. Next, the SEM image of the taken SEM photograph is image-processed so as to identify the refractory aggregate and the bonding material in this SEM image. For example, as a method for image-processing the SEM image, a method where a portion where the refractory aggregate is present and a portion where the bonding material is present in the SEM image are sorted by color is applicable. An apparatus for taking the SEM photograph (scanning electron microscope) is, for example, SU9000 (product name) manufactured by Hitachi High-Technologies Corporation. The SEM image can be image-processed with, for example, the image processing system XG (product name) manufactured by KEYENCE CORPORATION.

After identification between the refractory aggregate and the bonding material in the SEM image, an area of a range occupied by each constituent element may be measured.

This measurement allows obtaining "a proportion of area occupied by the bonding materials with respect to the total area of the refractory aggregates and the bonding materials." That is, whether the SEM image where the refractory aggregate and the bonding material are identified is the visual field meeting the condition (1) or not can be determined. This measurement is also can be performed using, for example, the image processing system XG (product name) manufactured by KEYENCE CORPORATION, similarly to the above-described image processing of the SEM image.

After the identification between the refractory aggregate and the bonding material in the SEM image, the particle diameter of the refractory aggregate can also be obtained. The particle diameter of the refractory aggregate means a particle diameter (sphere-equivalent diameter) obtained by converting the refractory aggregate into spherical particles. The method for obtaining the particle diameter of the refractory aggregate is as follows. First, a particle area (namely, a cross-sectional area) of the refractory aggregate in the SEM image is measured by the image processing. Next, the particle diameter converted into the spherical particles same area as the measured particle area is obtained. The obtained particle diameter, which is converted into the spherical particles, is regarded as the particle diameter of the refractory aggregate. Further, after the identification between the refractory aggregate and the bonding material in the SEM image, regarding the refractory aggregate whose particle diameter is 5 μm or more, a peripheral length of this refractory aggregate and a peripheral length of a portion of this refractory aggregate surrounded by the bonding material may be measured. Such measurement allows obtaining the refractory aggregate meeting the condition (2) present in the SEM image.

As described above, in the observation of the cross section of the partition wall with the electron microscope, when the number of refractory aggregates meeting the condition (2) is five pieces or more in observation of any given ten visual fields meeting the condition (1), it can be said that the porous bodies are porous bodies constituting the partition wall of the honeycomb structure of this embodiment. With the honeycomb structure of this embodiment, in the observation of the cross section of the partition wall with the electron microscope, when observing any given ten visual fields meeting the following condition (3), the number of refractory aggregates meeting the condition (2) is preferable to be five pieces or more.

Condition (3): the visual field is 70 μm square, and in the visual field, a proportion of an area occupied by the bonding materials to a total area of the refractory aggregates and the bonding materials in this visual field is 30% or more.

In the condition (3), a width of the visual field in the observation with the electron microscope is 70 μm square, which is the visual field in a range narrower than the condition (1). In this visual field as well, the number of refractory aggregates meeting the condition (2) of five pieces or more further increases the strength of the porous body. The observation with the electron microscope can be performed by the method similar to the method of observation of the visual field at 100 μm square with the electron microscope except a difference in the width of the visual field.

When observing any given ten visual fields meeting the condition (1), an average value of the number of refractory aggregates meeting the condition (2) in the ten visual fields is preferable to be five pieces or more, further preferable to be 7 to 20 pieces, and especially preferable to be 10 to 20 pieces. By obtaining the average value of the number of refractory aggregates meeting the condition (2) in the ten visual fields, an influence that the number of refractory aggregates meeting the condition (2) gives to the strength of the porous body and the pressure loss is easily checked.

To observe the any given ten visual fields meeting the condition (1), in the observation of the cross section of the partition wall with the electron microscope, the number of visual fields to be actually observed may be 10 visual fields or more. For example, in the observation of the cross section of the partition wall with the electron microscope, any given 15 visual fields meeting the condition (1) may be observed, or any given 20 visual fields may be observed.

(1-2) Refractory Aggregate:

As long as the refractory aggregate used for the honeycomb structure of this embodiment is particles made of a fixed-shaped refractory at 1000° C. or more, a kind of the refractory aggregate is not especially limited. For example, as the refractory aggregate, at least one kind selected from the group consisting of silicon carbide powder, silicon nitride powder, sialon, and alumina can be used. The refractory aggregate is more preferable to be at least one of the silicon carbide powder and the silicon nitride powder, and the silicon carbide powder is especially preferable. The material constituting the refractory aggregate can be defined by, for example, X-ray diffraction (XRD).

An average particle diameter of the refractory aggregate is preferable to be 0.5 to 200 μm, more preferable to be 2 to 100 μm, and especially preferable to be 3 to 50 μm. The average particle diameter of the refractory aggregate of less than 0.5 μm may increase an interface area, resulting in reduction of the thermal conductivity. The average particle diameter of the refractory aggregate of more than 200 μm generates a coarse pore, worsens trapping efficiency, and degrades the strength. The average particle diameter of the refractory aggregate can be obtained from the above-described SEM image obtained by the observation of the cross section of the partition wall with the electron microscope by the following method. First, the SEM image is image-processed. The refractory aggregate and the bonding material are then identified in this SEM image. Next, by the above-described method, the refractory aggregate is converted into the spherical particles (spherical particles of equivalent particle area), and the particle diameter is obtained. The average value of the particle diameters of the refractory aggregates in the ten visual fields in the SEM image is calculated. The calculated average value of the particle diameters of the refractory aggregates is regarded as the "average particle diameter of the refractory aggregate."

Although the details will be described later, even if the honeycomb structure is simply manufactured following the conventionally known manufacturing method, it is difficult to manufacture the honeycomb structure of this embodiment that meets the constitution of the porous body, which is described above. For example, to manufacture the honeycomb structure of this embodiment, as a raw material of the refractory aggregate, it is preferable to use refractory aggregate raw materials with two kinds of average particle diameters classified by sieving. For example, even the refractory aggregate raw material with one kind of average particle diameter classified with a sieve is used, it is difficult to fabricate the porous body where the number of refractory aggregates meeting the condition (2) is five pieces or more in the above-described observation with the electron microscope. In manufacturing the honeycomb structure, to use the refractory aggregate raw material with two kinds of average particle diameters classified with the sieve, it is preferable to use JIS standard sieves with two different kinds of meshes for classification of the refractory aggregate. As the JIS standard sieves of two kinds, using the JIS standard sieve with meshes of #800 or more and the JIS standard sieve with meshes of #1000 or more is preferable. It is preferable that mixed raw material particles where the classified refractory aggregate raw materials with the two kinds of average particle diameters are mixed shows a broad distribution where a logarithmic standard deviation is 0.6 or more. A specific surface area of the refractory aggregate raw material is preferable to be 4,000 $cm^2/cm^3$ or more and further preferable to be 5,000 $cm^2/cm^3$ or more. The specific surface area can be measured by a gas adsorption method.

(1-3) Bonding Material:

The bonding material used for the honeycomb structure of this embodiment is to bond the refractory aggregates in the porous bodies, which constitute the partition wall. The main constituent of this bonding material is the oxide material. It is preferable that the main constituent of the bonding material is an oxide made of metal of at least one kind selected from the group consisting of Al, Si, and Mg, or a mixture of these oxides. The oxide made of metal at least one kind selected from the group consisting of the above-described materials features excellent wettability with the refractory aggregate. Accordingly, a wider range of the surface of the refractory aggregate can be surrounded. Accordingly, even if the refractory aggregate has the particle diameter of 5 μm or more, 60% or more of the outer circumference thereof is likely to be surrounded by the bonding material.

To manufacture the honeycomb structure of this embodiment, it is preferable to include the following distinctive manufacturing process at the time of manufacturing. First, the bonding material is preferable to further include an oxide made of alkaline earth metal as a sintering aid during manufacturing the honeycomb structure. During manufacturing the honeycomb structure, it is preferable to contain a trace Na in a raw material for generating bonding material, which becomes the bonding material. When using the raw material for generating bonding material, which contains a trace Na, it is preferable to contain Na in the porous bodies, which constitute the partition wall, at 0.1 mass % or more to 0.3 mass % or less by $Na_2O$ conversion. A content ratio of Na in the porous body by the $Na_2O$ conversion can be measured by a method of wet quantitative analysis.

To fire the honeycomb formed body formed of a forming raw material containing the raw material for generating bonding material and the refractory aggregate raw material, it is preferable to set a firing temperature slightly higher than a firing temperature for the conventional method for manufacturing the honeycomb structure. When firing the honeycomb formed body at such high firing temperature, in the case where certain raw material for generating bonding material and refractory aggregate raw material are used, the wettability between the raw material for generating bonding material and the refractory aggregate raw material is significantly improved. Additionally, using the bonding material, the porous body where a wider surface of the refractory aggregate is covered is fabricated.

(1-4) Porous body, Partition Wall Made of Porous Body, and Honeycomb Structure Body:

The partition wall of the honeycomb structure body is made of the porous bodies. The porous body includes the refractory aggregate and the bonding material. The main constituent of the bonding material is an oxide material that bonds these refractory aggregates to each other. In this porous body, the mass proportion of the bonding material included in the porous body is 20 to 35 mass %. Regarding this porous body, in the observation of the cross section of the partition wall with the electron microscope, when observing any given ten visual fields meeting the condition (1), the number of refractory aggregates meeting the condition (2) is five pieces or more in all of these ten visual fields.

A porosity of the partition wall is preferable to be 25 to 75%, further preferable to be 25 to 70%, and especially preferable to be 27 to 69%. The porosity of the partition wall is a porosity of the porous bodies, which constitute the partition wall of the honeycomb structure. The porosity of the partition wall of less than 25% may increases the pressure loss of the honeycomb structure. The porosity of the partition wall of more than 75% makes the partition wall of the honeycomb structure fragile, and consequently that the partition wall can be easily missed. The porosity of the partition wall is a value measured by a mercury porosimeter.

An average pore diameter of the partition wall is preferable to be 5 to 35 μm, further preferable to be 7 to 30 μm, and especially preferable to be 7 to 25 μm. The average pore diameter of the partition wall of less than 5 μm may increase the pressure loss of the honeycomb structure. The average pore diameter of the partition wall of more than 35 μm may makes the partition wall of the honeycomb structure fragile and consequently that the partition wall can be easily missed. The average pore diameter of the partition wall is a value measured by a mercury porosimeter.

A thickness of the partition wall is not especially limited. However, the thickness is preferable to be 50 to 500 μm, further preferable to be 75 to 400 μm, and especially preferable to be 100 to 200 μm. Setting the thickness of the partition wall in the above ranges allows reducing an increase in pressure loss while maintaining the strength of the partition wall of the honeycomb structure.

A cell density of the honeycomb structure body is not especially limited. However, the cell density is preferable to be 10 to 64 $cells/cm^2$, further preferable to be 16 to 55 $cells/cm^2$, and especially preferable to be 30 to 58 $cells/cm^2$. Setting the cell density in the above ranges allows improving the trapping efficiency when using the honeycomb structure as a filter and purification efficiency when the honeycomb structure is used as a catalyst carrier.

A shape of the cell formed at the honeycomb structure body is not especially limited. Here, the "shape of the cell" means the shape of cell at the cross section perpendicular to the cell extending direction of the honeycomb structure body. The cell can have, for example, a quadrangular shape, a hexagonal shape, an octagonal shape, or a combination of these shapes.

The shape of the honeycomb structure body is not especially limited. For example, the shape can be a pillar shape with circular bottom surface (columnar shape), a pillar shape with oval bottom surface, a pillar shape with polygonal bottom surface (such as a quadrangular shape, a pentagonal shape, a hexagonal shape, a heptagonal shape, and an octagonal shape).

For example, a length from the first end face to the second end face of the honeycomb structure body and a size of the cross section perpendicular to the cell extending direction of the honeycomb structure body may be appropriately selected so as to obtain optimum purification performance when using the honeycomb structure as the catalyst carrier for purifying exhaust gas. For example, the length from the first end face to the second end face of the honeycomb structure body is preferable to be 50 to 600 mm, and further preferable to be 75 to 500 mm. An area of the cross section perpendicular to the cell extending direction of the honeycomb structure body is preferable to be 4,500 to 200,000 mm², and further preferable to be 5,000 to 100,000 mm².

Figure 5:
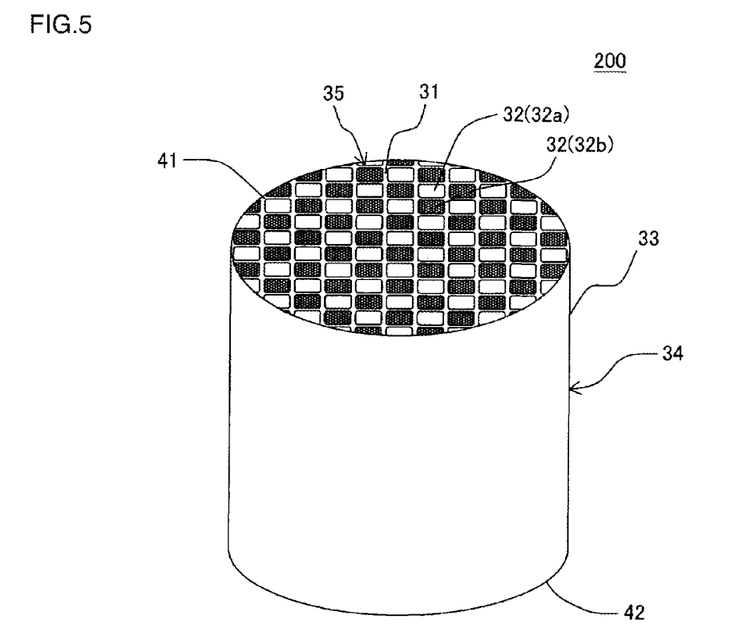
FIG. 5 is a schematic perspective view when a honeycomb structure of another embodiment of the present invention is viewed from the inflow end face side.
Figure 6:
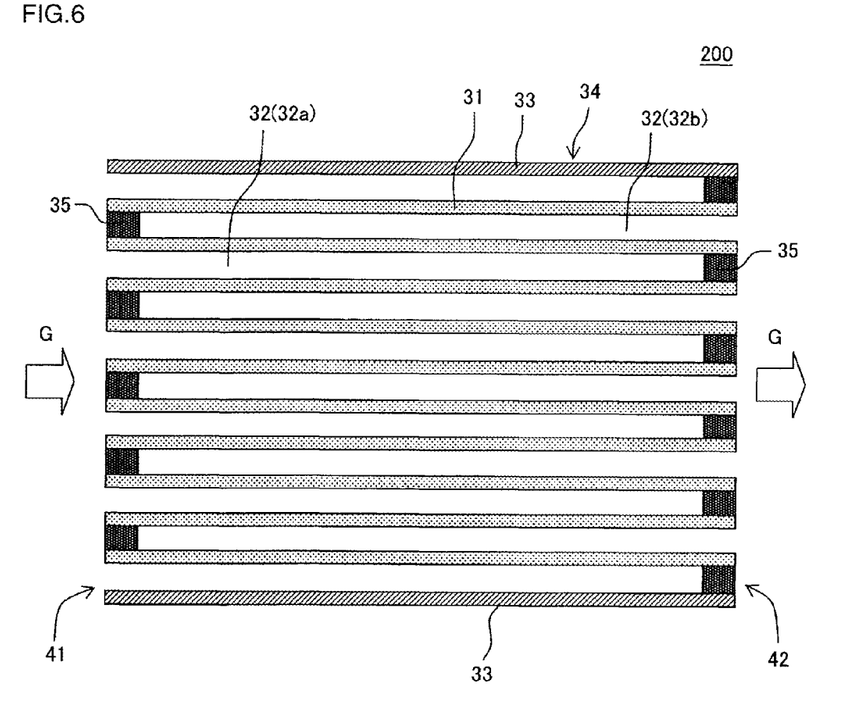
FIG. 6 is a schematic cross-sectional view showing a cross section parallel to a cell extending direction of the honeycomb structure shown in FIG. 5.

The honeycomb structure also may be a honeycomb structure 200 shown in FIG. 5 and FIG. 6. FIG. 5 is a schematic perspective view when a honeycomb structure of another embodiment of the present invention is viewed from the inflow end face side. FIG. 6 is a schematic cross-sectional view showing a cross section parallel to the cell extending direction of the honeycomb structure shown in FIG. 5. The honeycomb structure 200 includes a columnar-shaped honeycomb structure body 34 and a plugging portion 35. The plugging portion 35 is disposed at an open end of a cell 32 formed at the honeycomb structure body 34. The honeycomb structure body 34 has a porous partition wall 31. The partition wall 31 defines the plurality of cells 32. The cells 32 extend from a first end face 41 to a second end face 42 and become channels for fluid. The honeycomb structure 200 shown in FIG. 5 and FIG. 6 further has a circumferential wall 33. The circumferential wall 33 is positioned at the outermost circumference of the honeycomb structure body 34. The plugging portions 35 are disposed at an open end of a predetermined cell 32b at the first end face 41 and an open end of a residual cell 32a at the second end face 42. The plugging portions 35 plug the open ends at one side of the respective cells 32 (32a and 32b) formed at the honeycomb structure body 34. The honeycomb structure 200 including the plugging portions 35 can be preferably used as a filter for trapping and removing a particulate matter contained in a dust-containing fluid such as a diesel engine exhaust gas. The partition wall 31 of the honeycomb structure body 34 of this honeycomb structure 200 is also formed of the porous bodies similarly constituted as the porous bodies constituting the partition wall 1 of the honeycomb structure body 4 shown in FIG. 1 to FIG. 4. That is, the porous bodies constituting the partition wall 31 contains the bonding material at the mass proportion of 20 to 35 mass %. In the observation of the cross section of the partition wall 31 with the electron microscope, when observing any given ten visual fields meeting the condition (1), the number of refractory aggregates meeting the condition (2) is five pieces or more in all of these ten visual fields.

The material for forming the plugging portion is not especially limited. A material used for the plugging portion of the conventionally-known honeycomb structure can be used. The method for forming the plugging portion can also be performed following a conventionally-known method for forming the plugging portion of the honeycomb structure.

Figure 7:
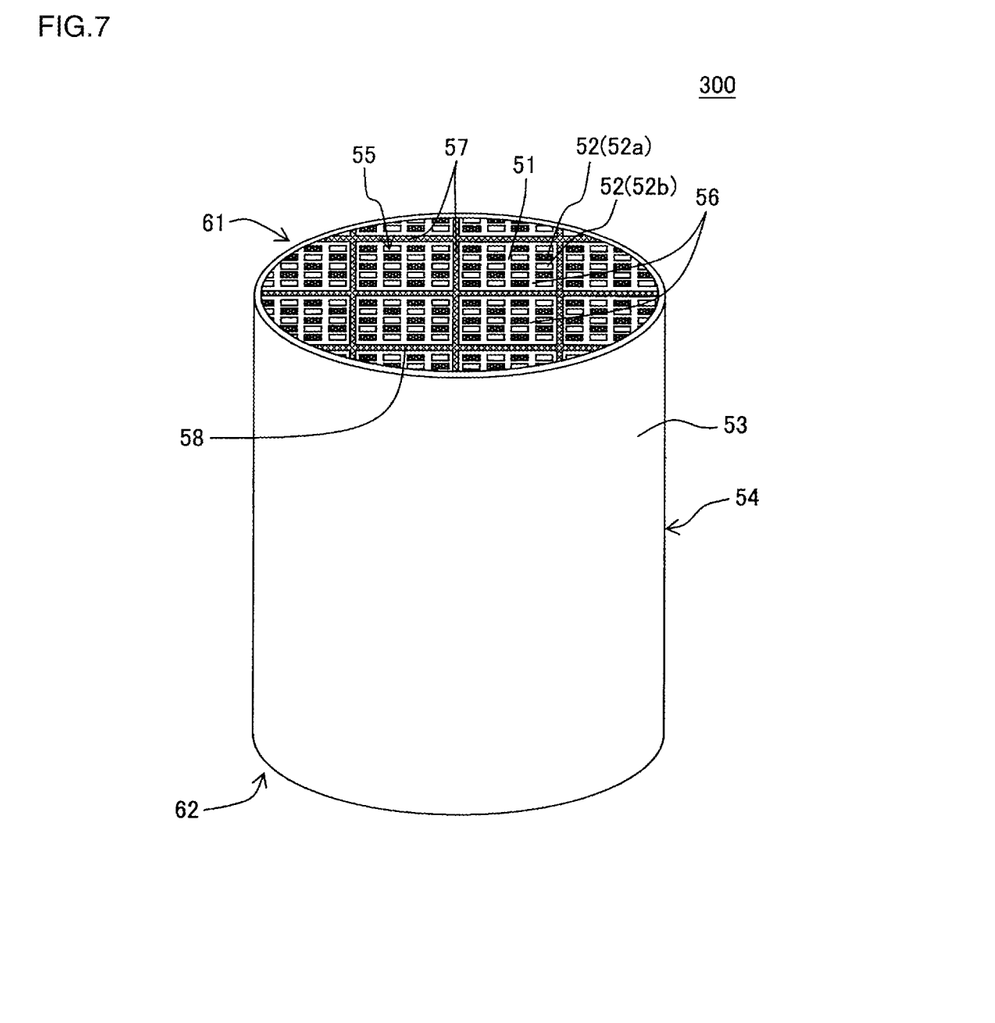
FIG. 7 is a schematic perspective view when a honeycomb structure of yet another embodiment of the present invention is viewed from the inflow end face side.

The honeycomb structure body of the honeycomb structure may have the following segment structure. The honeycomb structure body has a plurality of columnar-shaped honeycomb segments having the partition wall. The side surfaces of the plurality of honeycomb segments are adjacently disposed so as to be opposed to one another and are bonded. The honeycomb structure that includes the honeycomb structure body of segment structure is, for example, a honeycomb structure 300 as shown in FIG. 7. FIG. 7 is a schematic perspective view when a honeycomb structure of yet another embodiment of the present invention is viewed from the inflow end face side. The honeycomb structure 300 shown in FIG. 7 includes a honeycomb structure body 54. The honeycomb structure body 54 includes a plurality of honeycomb segments 56. The honeycomb segments 56 are bonded with bonding layers 57 in a state where the side surfaces of the honeycomb segments 56 are adjacently disposed so as to be opposed to one another. The honeycomb segments 56 have partition walls 58 and outer walls 58. The porous partition walls 51 define a plurality of cells 52 (a cell 52a and a cell 52b) extending from a first end face 61 to a second end face 62 and become channels for fluid. The outer wall 58 is disposed so as to surround the partition walls. A bonding layer 57 bonds the outer walls 58 of the honeycomb segments 56 that are adjacently arranged. This bonding layer 57 may have a function as a buffer for buffering thermal stress generated at the honeycomb structure body 54. At the honeycomb structure 300 shown in FIG. 7, a circumferential wall 53 is disposed at the outermost circumference of a bonded assembly where the plurality of honeycomb segments 56 are bonded.

In the honeycomb structure body 54 of the segment structure, among the plurality of honeycomb segments 56, at least one of the partition wall 51 of the honeycomb segments 56 is formed of the porous bodies similarly constituted to the porous bodies, which constitute the partition wall 1 of the honeycomb structure body shown in FIG. 1 to FIG. 4. It is more preferable that all the partition walls 51 of the honeycomb segments 56, which constitute the honeycomb structure body 54, be formed of the porous bodies similarly constituted to the porous bodies, which constitute the partition wall 1 of the honeycomb structure body shown in FIG. 1 to FIG. 4. In FIG. 7, reference numeral 55 denotes a "plugging portion" disposed at the open end of the cell 52. Even with such so-called honeycomb structure of segment structure, actions and effects similar to a so-called integrated honeycomb structure as shown in FIG. 1 to FIG. 3 can be obtained. A bonding layer similarly constituted to the bonding layer of the honeycomb structure body of the conventionally-known segment structure is applicable.

(2) Method for Manufacturing Honeycomb Structure:

The following describes a method for manufacturing the honeycomb structure of this embodiment. The following describes the method for manufacturing the honeycomb structure of this embodiment exemplifying the method for manufacturing the honeycomb structure 300 of the segment structure as shown in FIG. 7.

First, the silicon carbide powder, powder of raw material for generating bonding material, and an oxide are mixed. The silicon carbide powder becomes the refractory aggregate. The powder of raw material for generating bonding material generates the bonding material by firing. The oxide is made of the alkaline earth metal as the sintering aid. As necessary, a binder, surfactant, pore former, water, and the like are added thereto, thus fabricating a forming raw material. The raw material for generating bonding material is, for example, a raw material that generates "cordierite as the bonding material" by firing. Instead of the powder of the raw material for generating bonding material, the forming raw material may be fabricated using a cordierite forming raw material. The cordierite raw material means a raw material that generates a cordierite crystal by firing. The following may describe the "powder of the raw material for generating bonding material" as the "raw material powder for generating bonding material." The raw material powder for generating bonding material is, for example, mixed powder constituted of talc of 35.9 mass %, aluminum hydroxide of 44.3 mass %, and silica powder of 19.8 mass %. A kind and an amount of combination of the raw material powder contained in the raw material powder for generating bonding material are not limited to the above-described mixed powder. As the raw material for generating bonding material, a raw material that generates "cordierite and mullite particles, which are the bonding materials" by firing may be used. The following describes an example where the silicon carbide powder is used as the refractory aggregate. However, as the refractory aggregate, the silicon nitride powder can also be used.

The average particle diameter of the silicon carbide powder, which becomes the refractory aggregate, is preferable to be 5 to 20 µm, and further preferable to be 10 to 15 µm. The average particle diameter is a value measured by a laser diffraction method. When using the silicon nitride powder as the refractory aggregate, the silicon nitride powder is preferable to have the average particle diameter to the same extent as the silicon carbide powder.

As a binder to be added to the forming raw material, an organic binder, such as methylcellulose, hydroxypropoxyl cellulose, hydroxyethyl cellulose, carboxymethyl cellulose, and polyvinyl alcohol, can be used. Among these materials, using the methylcellulose and the hydroxypropoxyl cellulose together is preferable. An amount of added binder is preferable to be 2 to 10 mass % with respect to the entire forming raw material.

As surfactant to be doped to the forming raw material, ethylene glycol, dextrin, fatty acid, soap, polyalcohol, and the like can be used. One of these surfactants may be used alone, or a combination of two or more of the surfactants may be used. An amount of doped surfactant is preferable to be 2 mass % or less with respect to the entire forming raw material.

There is not any special restriction on the pore former, as long as pores are formed after the firing, and examples of the pore former include graphite, starch, foamable resin, a water absorbable resin, and silica gel. An amount of doped pore former is preferable to be 10 mass % or less with respect to the entire forming raw material. An average particle diameter of the pore former is preferable to be 10 to 30 µm. When the average particle diameter of the pore former is smaller than 10 µm, the pores possibly cannot sufficiently be formed in the partition wall. When the average particle diameter of the pore former is larger than 30 µm, a die may be clogged at forming. The average particle diameter of the pore former is a value measured by the laser diffraction method. In the case where the pore former is a water absorbable resin, the average particle diameter of the pore former is a value after absorption of water.

An amount of doped water is appropriately adjusted so as to have clay hardness where the clay is likely to be formed. However, the amount of doped water is preferable to be 20 to 80 mass % with respect to the entire forming raw material.

Next, the obtained forming raw material is kneaded to forma kneaded material. There is not any special restriction on a method of kneading the forming raw material to form the kneaded material, and an example of the method can be a method in which a kneader, a vacuum pugmill, and the like is used.

Next, the obtained kneaded material is extruded to form a honeycomb formed body. In the extrusion, a die having a desirable entire shape, cell shape, partition wall thickness, cell density, and the like is preferably used. A material of the die is preferably a cemented carbide that does not easily wear down. The honeycomb formed body has a structure that has the partition wall and the outer wall. The partition wall defines the plurality of cells, which become channels for fluid. The outer wall is positioned at the outermost circumference. The partition wall thickness, the cell density, the thickness of outer wall, and the like of the honeycomb formed body can be appropriately determined according to the structure of the honeycomb structure to be fabricated, in consideration of contraction due to drying and firing. When fabricating the honeycomb structure body 34 of the honeycomb structure 200 shown in FIG. 5 and FIG. 6, a columnar honeycomb formed body is fabricated according to the shape of the honeycomb structure body 34. Then, the obtained columnar honeycomb formed body is fired. Thus, the honeycomb structure that includes the columnar honeycomb structure body can be manufactured. Meanwhile, to manufacture the honeycomb structure 300 as shown in FIG. 7, an extruded honeycomb formed body becomes one piece of the honeycomb segment 56. Accordingly, to manufacture the honeycomb structure 300 as shown in FIG. 7, a plurality of honeycomb formed bodies are formed at the extrusion. As described later, the obtained honeycomb formed body is fired to obtain the plurality of honeycomb segments 56. The obtained plurality of honeycomb segments 56 are bonded with bonding layers 57. Thus, the honeycomb structure 300 is fabricated.

The obtained honeycomb formed body is preferably dried before firing. There is not any special restriction on a drying method, and examples of the method can include electromagnetic heating systems such as microwave heating drying and high-frequency dielectric heating drying, and external heating systems such as hot air drying and superheat vapor drying. In these examples, it is preferable that a predetermined amount of moisture be dried by the electromagnetic heating system, and then the remaining moisture be dried by the external heating system in that the entire honeycomb formed body can immediately and evenly be dried such that any cracks are not generated. As drying conditions, it is preferable that the moisture of 30 to 99 mass % with respect to an amount of the moisture prior to the drying be removed by the electromagnetic heating system, and then the moisture be decreased to 3 mass % or less by the external heating system. The electromagnetic heating system is preferably the dielectric heating drying. The external heating system is preferably the hot air drying.

Next, when the length of the honeycomb formed body in cell extending direction is not a desirable length, both end faces (both end portions) are preferably cut such that the length is the desirable length. There is not any special restriction on a cutting method, and, for example, the cutting method can include a method using a disc saw cutter and the like.

Next, the honeycomb formed body is fired to fabricate the honeycomb segment. Prior to the firing, calcination is preferably performed to remove the binder and the like. The calcination is preferably performed at 200 to 600° C. in the air atmosphere for 0.5 to 20 hours. The firing is preferable to be heated for 1 to 20 hours at normal pressure, at 1400 to 1460° C., and under non-oxidizing atmosphere, such as nitrogen and argon (oxygen partial pressure: $10^{-4}$ atmospheric pressure or less). After firing, to improve durability, the oxidized treatment may be performed for 1 to 20 hours at 1100 to 1400° C. under atmosphere (may contain water vapor). The calcination and firing can be performed by using, for example, an electric furnace and a gas furnace.

Next, an open end of a predetermined cell (for example, a first cell) at the first end face (for example, inflow end face) and an open end of residual cell (for example, a second cell) at the second end face (for example, an outflow end face) of each obtained honeycomb segment were plugged to form plugging portions. When fabricating the formed body for the columnar honeycomb structure body 34 as shown in FIG. 5 and FIG. 6 during the extrusion, forming the plugging portions completes the honeycomb structure 200 (in other words, a honeycomb filter that includes the plugging portions).

To fill the honeycomb segment with a plugging material, first, the plugging material is filled from the first end face (for example, the inflow end face) side of the honeycomb segment to the inside of the predetermined cell (for example, the first cell). Afterwards, the plugging material is filled from the second end face (for example, the outflow end face) side to the inside of the residual cells (for example, the second cells). As a method for filling the plugging material, the method including the following masking process and press-in process is applicable. The masking process attaches a sheet to the first end face (for example, the inflow end face) of the honeycomb segment. Then, holes are formed on the sheet at a positions overlapping "a cell where a plugging portion is to be formed (namely, the first cell) in the sheet." The press-in process inserts, under pressure, "the end of the honeycomb segment to which the sheet is attached" into a container where the plugging material is stored. Then, the plugging material is pressed into the cells of the honeycomb segment. When the plugging material is pressed into the cells of the honeycomb segment, the plugging material passes through the holes formed in the sheet and the plugging material is only filled to the cells communicating with the holes formed in the sheet. The method for filling the plugging material from the second end face (for example, the outflow end face) of the honeycomb segment in the cell is also preferable to be the similar method to the method for filling the plugging material from the first end face of the honeycomb segment in the cell. The plugging materials may be filled from both end faces of the honeycomb segment at the same time.

Next, the plugging materials filled in the cells of the honeycomb segment are preferably dried to form the plugging portions and to obtain a plugged honeycomb segment. To secure the plugging material with more certainty, the plugging material may be fired after drying. The plugging material may be filled to the formed body of the honeycomb segment before drying or the formed body of the honeycomb segment after drying. Then, together with the formed body of the honeycomb segment before drying or the formed body of the honeycomb segment after drying, the plugging material may be fired.

Next, the respective obtained honeycomb segments are bonded with the bonding materials. Thus, the honeycomb structure 300 as shown in FIG. 7 can be obtained. As the bonding material, for example, slurry obtained by adding additives, such as an organic binder, foamable resin, and a dispersing agent, to an inorganic raw material, such as an inorganic fiber, colloidal silica, a clay, and SiC particles, and further adding water thereto, followed by kneading can be used.

After bonding the plurality of honeycomb segments with the bonding materials, it is preferable to cut the outer circumference portion of the obtained bonded assembly of the honeycomb segments so as to be a desired shape. After bonding the honeycomb segments and cutting the outer circumference portion of the bonded assembly of the honeycomb segments, it is preferable to dispose an outer circumference coating material at the outer circumference portion to fabricate a honeycomb filter. This outer circumference coating material becomes an outer circumference coating layer of the honeycomb filter. Disposing the outer circumference coating layer has an advantage, such as improvement of roundness of the honeycomb filter. As the outer circumference coating material, slurry same as the slurry fabricated as the bonding material can be used.

This constitution allows manufacturing the honeycomb structure of this embodiment. However, the method for manufacturing the honeycomb structure of this embodiment is not limited to the above-described manufacturing method.

EXAMPLE

Hereinafter, the present invention will further specifically be described with examples, but the present invention is not limited to these examples.

Example 1

Example 1 first prepared a forming raw material for fabricating a honeycomb structure by the following method. Silicon carbide (SiC) powder, which becomes the refractory aggregate, and raw material powder for generating bonding material were mixed at a ratio of 70:30 (volume ratio). Thus, "mixed powder" was fabricated. The silicon carbide (SiC) powder had the average particle diameter of 14 μm and the specific surface area of 4000 $cm^2/cm^3$. As the silicon carbide (SiC) powder, which becomes the refractory aggregate, the mixture of the powders with two kinds of average particle diameters classified by the sieving was used. The silicon carbide powders of two kinds of average particle diameters were powder classified with the JIS standard sieve with meshes of #800 or more and powder classified with the JIS standard sieve with meshes of #1000 or more. As the powder for generating bonding material, powder that contains talc of 45.1 volume %, kaolin of 32.8 volume %, and aluminum hydroxide of 22.1 volume % were used. Then, to the "mixed powder", a $CeO_2$ as the sintering aid, hydroxypropylmethyl cellulose as a binder, and a starch and water absorbable resin as the pore former were doped. Further, water was then added to form the forming raw material. When setting the mixed powder as 100 parts by mass, a content of $CeO_2$ as the sintering aid was 3 parts by mass. When setting the mixed powder as 100 parts by mass, a content of the binder was 7 parts by mass. When setting the mixed powder as 100 parts by mass, a content of the pore former was 10 parts by mass. When setting the mixed powder as 100 parts by mass, a content of the water was 70 parts by mass. The average particle diameter of $CeO_2$ was 20 μm. The average particle diameter of the pore former was 22 μm. The average particle diameter of talc of the powder for generating bonding material was 3 μm. The average particle diameter of the kaolin was 1 μm. The average particle diameter of aluminum hydroxide was 0.2 μm. The average particle diameters of the silicon carbide powder, the talc of powder for generating bonding material, the kaolin, aluminum hydroxide, and pore former are values measured by a laser diffraction method. The specific surface area of the silicon carbide (SiC) powder is a value measured by the gas adsorption method.

Next, the obtained forming raw material was kneaded and further kneaded to form a kneading material. Next, the kneading material was extruded with a predetermined die, thus obtaining the honeycomb formed body. In the honeycomb formed body, quadrangular-shaped cells were formed at the cross section perpendicular to the cell extending direction. The entire shape of the honeycomb formed body was a columnar shape. Then, the obtained honeycomb formed body was dried with a microwave dryer. Afterwards, the honeycomb formed body was further dried with the hot-air drier. Subsequently, both ends of the dried honeycomb formed body were cut off to trim the honeycomb formed body at predetermined dimensions. After the firing, the honeycomb formed body with a diameter of the end face being 144 mm and a length in the cell extending direction being 152 mm was formed.

The honeycomb formed body thus obtained was fired for two hours at 1450° C., thus obtaining the honeycomb structure. The obtained honeycomb structure had the thickness of the partition wall being 380 μm, the cell density being 46.5 cells/cm², and the porosity of the partition wall being 68%.

Example 1 uses the "silicon carbide (SiC) powder" as the refractory aggregate; therefore, the main constituent of the refractory aggregate was "SiC." Example 1 uses the "powder that generates cordierite by firing" as the raw material powder for generating bonding material; therefore, the main constituent of the bonding material was the "cordierite." A volume proportion of the bonding material to a total volume of the refractory aggregate and the bonding material was 30 volume %. This volume proportion is a value found by converting an area ratio from the image analysis. The "Aggregate Main Constituent" column in Table 1 shows the main constituent of the refractory aggregate. The "Bonding Material Main Constituent" column in Table 1 shows the main constituent of the bonding material. The "Bonding Material Proportion (%)" column in Table 1 shows a "volume proportion of the bonding material with respect to the total volume of the refractory aggregate and the bonding material." The "Aggregate Raw Material Average Particle Diameter (μm)" column in Table 1 shows the average particle diameters of the powder used as the refractory aggregate. The "Sintering Aid" column in Table 1 shows the constituent of the sintering aid doped to the forming raw material. The "Aggregate Raw Material Specific Surface Area (cm²/cm³)" column in Table 1 shows the "specific surface area of the powder used as the refractory aggregate."

Regarding the partition wall of the obtained honeycomb structure, the content ratio of Na in the porous body constituting this partition wall was measured by the $Na_2O$ conversion. The following may describe the content ratio of Na in the porous body by the $Na_2O$ conversion simply as the "content ratio (%) of $Na_2O$." The content ratio of $Na_2O$ was 0.1 mass %. Table 1 shows the results. The content ratio of $Na_2O$ was measured by wet quantitative analysis.

Table 1 shows the firing temperature during manufacturing (° C.), the thickness of partition wall (μm), the cell density (cell/cm²), the porosity of partition wall (%), the diameter of end face of the honeycomb structure (mm), and the length of the honeycomb structure in the cell extending direction (mm).

TABLE 1

| | Aggregate Main Constituent | Bonding Material Main Constituent | Bonding Material Proportion (%) | Aggregate Raw Material Average Particle Diameter (μm) | Sintering Aid | Firing Temperature (° C.) | Content Ratio of $Na_2O$ (%) |
|---|---|---|---|---|---|---|---|
| Example 1 | SiC | Cordierite | 30 | 14 | $CeO_2$ | 1450 | 0.1 |
| Example 2 | SiC | Cordierite | 30 | 13 | $CeO_2$ | 1450 | 0.1 |
| Example 3 | SiC | Cordierite | 30 | 11.5 | $CeO_2$ | 1450 | 0.1 |
| Comparative Example 1 | SiC | Cordierite | 30 | 11.5 | None | 1450 | 0.15 |
| Comparative Example 2 | SiC | Cordierite | 30 | 22 | $CeO_2$ | 1450 | 0.1 |
| Comparative Example 3 | SiC | Cordierite | 30 | 11.5 | $CeO_2$ | 1380 | 0.1 |
| Comparative Example 4 | SiC | Cordierite | 30 | 11.5 | $CeO_2$ | 1450 | 0 |
| Comparative Example 5 | SiC | Cordierite | 30 | 11.5 | $CeO_2$ | 1450 | 0.02 |

| | Thickness of Partition Wall (μm) | Cell Density (cell/cm²) | Porosity (%) | Diameter (mm) | Length (mm) | Aggregate Raw Material Specific Surface Area (cm²/cm³) |
|---|---|---|---|---|---|---|
| Example 1 | 380 | 46.5 | 68 | 144 | 152 | 4000 |
| Example 2 | 380 | 46.5 | 68 | 144 | 152 | 5000 |
| Example 3 | 380 | 46.5 | 68 | 144 | 152 | 5500 |
| Comparative Example 1 | 380 | 46.5 | 68 | 144 | 152 | 5500 |
| Comparative Example 2 | 380 | 46.5 | 68 | 144 | 152 | 4000 |
| Comparative Example 3 | 380 | 46.5 | 68 | 144 | 152 | 5500 |
| Comparative Example 4 | 380 | 46.5 | 68 | 144 | 152 | 5500 |
| Comparative Example 5 | 380 | 46.5 | 68 | 144 | 152 | 5500 |

The honeycomb structure of Example 1 was measured on the "Number of Specific Refractory Aggregates" and the "Average Number of Specific Refractory Aggregates" by the following method. The honeycomb structure of Example 1 was also measured on "Pressure Loss (MPa)" and "Strength (MPa)" by the following method. The measurement results are shown in Table 2. With the honeycomb structure of Example 1, the "Number of Specific Refractory Aggregates" was five pieces.

[Number of Specific Refractory Aggregates]

In the examples, the specific refractory aggregate means "the refractory aggregate with the particle diameter of 5 μm or more and the refractory aggregate whose 60% or more of the outer circumference is surrounded by the bonding material." That is, the refractory aggregate meeting the condition (2) in the observation with the electron microscope described above is the "specific refractory aggregate" in the examples. First, in measurement of the number of specific refractory aggregates, a sample of 5 mm square cube for observation with the electron microscope was cut out from the honeycomb structure and fabricated. This sample was cut such that the cross section of the partition wall was viewable at the surface of the cut cube. Next, the obtained sample was buried with resin and was hardened. Then, the surface of the sample was polished. Next, an SEM photograph of a portion of the surface of the sample where the cross section of the partition wall appeared was taken with a magnification power of 400. Next, the SEM image of the taken SEM photograph was image-processed so as to identify the refractory aggregate and the bonding material in this SEM image. As a method for image-processing the SEM image, a method where a portion where the refractory aggregate was present and a portion where the bonding material was present in the SEM image were sorted by color was used. As an apparatus for taking the SEM photograph, SU9000 (product name) manufactured by Hitachi High-Technologies Corporation was used. The SEM image was image-processed with the image processing system XG (product name) manufactured by KEYENCE CORPORATION.

After identification between the refractory aggregate and the bonding material in the SEM image, an area of a range occupied by each constituent element was measured. From this measurement, "a proportion of area occupied by the bonding materials with respect to the total area of the refractory aggregates and the bonding materials" was obtained. Whether the visual field meeting the condition (1) or not was determined. Here, the condition (1) is "the visual field is 100 μm square, and in the visual field, a proportion of an area occupied by the bonding materials to a total area of the refractory aggregates and the bonding materials in this visual field is 30% or more." After the identification between the refractory aggregate and the bonding material in the SEM image, the particle diameter of the refractory aggregate was obtained by converting the particle area into an equivalent spherical particle diameter. Further, after the identification between the refractory aggregate and the bonding material in the SEM image, the refractory aggregate with the particle diameter of 5 μm or more was measured on a peripheral length of this refractory aggregate and a peripheral length of a portion of this refractory aggregate surrounded by the bonding material. From these measurement results, the number of specific refractory aggregates present in the SEM image was obtained. In the measurement of the number of specific refractory aggregates, any given 15 visual fields meeting the condition (1) were observed. Among the 15 visual fields, the visual field where the number of specific refractory aggregates was the fewest was set as the "Number of Specific Refractory Aggregates." The "number of visual fields observed by the measurement of the number of specific refractory aggregates" was shown in the "Number of Observed Visual Fields" column in Table 2.

[Average Number of Specific Refractory Aggregates]

An average value of the number of specific refractory aggregates in the respective 15 visual fields observed in the above-described measurement of the "Number of Specific Refractory Aggregates" was set as the "Average Number of Specific Refractory Aggregates."

[Pressure Loss (Mpa)]

Under a room temperature condition, air was passed through the honeycomb structure at a flow rate of 0.5 m³/minute. In this state, a difference (MPa) between pressure on an air inflow side and pressure on an air outflow side was measured.

[Strength (MPa)]

The strength of the honeycomb structure was measured based on the isostatic fracture strength test specified by M505-87, automobile standard issued by Society of Automotive Engineers of Japan, Inc. (JASO standard). The isostatic fracture strength test is a test that imitates a compressive load application in the case where the honeycomb structure is grasped by the outer circumference surface in a can body of a converter. A specific measurement method is as follows. The isostatic fracture strength test first put the honeycomb structures manufactured in the respective examples into a rubber, tubular-shaped container and lidded the tubular-shaped container with an aluminum plate. Then, the isostatic fracture strength test performed isotropic pressure compression on the tubular-shaped container under water. Then, an applied pressure value (MPa) when the honeycomb structure in the tubular-shaped container was broken was measured. The applied pressure value (MPa) when the honeycomb structure was broken is the "Strength (MPa)."

TABLE 2

| | Number of Specific Refractory Aggregates (Piece) | Number of Observed Visual Fields (Visual Field) | Average Number of Specific Refractory Aggregates (Piece) | Pressure Loss (MPa) | Strength (MPa) |
|---|---|---|---|---|---|
| Example 1 | 5 | 15 | 6.2 | 1.0 | 2.0 |
| Example 2 | 8 | 15 | 11.3 | 0.8 | 2.2 |
| Example 3 | 10 | 15 | 13.5 | 0.7 | 2.3 |
| Comparative Example 1 | 1 | 15 | 2.1 | 1.8 | 0.8 |
| Comparative Example 2 | 2 | 15 | 3.1 | 1.7 | 0.9 |
| Comparative Example 3 | 0 | 15 | 0.3 | 1.9 | 0.7 |
| Comparative Example 4 | 1 | 15 | 1.3 | 1.8 | 0.8 |
| Comparative Example 5 | 0 | 15 | 0.8 | 1.9 | 0.8 |

Examples 2 and 3

In Examples 2 and 3, the aggregate raw material average particle diameter (μm), the content ratio of Na₂O (%), and the aggregate raw material specific surface area (cm²/cm³) were changed as shown in Table 1. Except for that, the honeycomb structure was manufactured by the method similar to Example 1. Example 2 used the silicon carbide (SiC) powder of the average particle diameter of 13 μm as the refractory aggregate. Example 3 used the silicon carbide (SiC) powder of the average particle diameter of 11.5 μm as the refractory aggregate. Table 1 shows the aggregate main constituent, the bonding material main constituent, the bonding material proportion (%), the aggregate raw material average particle diameter (μm), the sintering aid, and the content ratio of Na$_2$O (%) in Examples 2 and 3. Table 1 shows the firing temperature during manufacture (° C.), the thickness of partition wall (μm), the cell density (cell/cm$^2$), the porosity of partition wall (%), the diameter of end face of honeycomb structure (mm), and the length of the honeycomb structure in the cell extending direction (mm) in Examples 2 and 3.

Regarding the honeycomb structures of Examples 2 and 3, the "Number of Specific Refractory Aggregates", "Average Number of Specific Refractory Aggregates", "Pressure Loss (MPa)", and "Strength (MPa)" were measured by the method similar to Example 1. The measurement results are shown in Table 2. The "Number of Specific Refractory Aggregates" of the honeycomb structure of Example 2 was eight pieces. The "Number of Specific Refractory Aggregates" of the honeycomb structure of Example 3 was ten pieces.

Comparative Examples 1 to 5

In Comparative Examples 1 to 5, the aggregate raw material average particle diameter (μm), the sintering aid, the firing temperature (° C.), the content ratio of Na$_2$O (%), and the aggregate raw material specific surface area (cm$^2$/cm$^3$) were changed as shown in Table 1. Except for that, the honeycomb structure was manufactured by the method similar to Example 1. Comparative Example 1 used the silicon carbide (SiC) powder of the average particle diameter of 11.5 μm as the refractory aggregate. Comparative Example 2 used the silicon carbide (SiC) powder of the average particle diameter of 22 μm as the refractory aggregate. Comparative Example 3 used the silicon carbide (SiC) powder of the average particle diameter of 11.5 μm as the refractory aggregate. Comparative Example 4 used the silicon carbide (SiC) powder of the average particle diameter of 11.5 μm as the refractory aggregate. Comparative Example 5 used the silicon carbide (SiC) powder of the average particle diameter of 11.5 μm as the refractory aggregate. Table 1 shows the aggregate main constituent, the bonding material main constituent, the bonding material proportion (%), the aggregate raw material average particle diameter (μm), the firing aid, and the content ratio of Na$_2$O (%) in Comparative Examples 1 to 5. Table 1 shows the firing temperature during manufacture (° C.), the thickness of partition wall (μm), the cell density (cell/cm$^2$), the porosity of partition wall (μm), the diameter of end face of honeycomb structure (mm), and the length of the honeycomb structure in the cell extending direction (mm) in Comparative Examples 1 to 5.

Regarding the honeycomb structures of Comparative Examples 1 to 5, the "Number of Specific Refractory Aggregates", "Average Number of Specific Refractory Aggregates", "Pressure Loss (MPa)", and "Strength (MPa)" were measured by the method similar to Example 1. The measurement results are shown in Table 2. The "Number of Specific Refractory Aggregates" of the honeycomb structure of Comparative Example 1 was one piece. The "Number of Specific Refractory Aggregates" of the honeycomb structure of Comparative Example 2 was two pieces. The "Number of Specific Refractory Aggregates" of the honeycomb structure of Comparative Example 3 was zero pieces. The "Number of Specific Refractory Aggregates" of the honeycomb structure of Comparative Example 4 was one piece. The "Number of Specific Refractory Aggregates" of the honeycomb structure of Comparative Example 5 was zero pieces.

(Results)

The honeycomb structures of Examples 1 to 3 exhibited low pressure loss and high strength. On the other hand, the honeycomb structures of Comparative Examples 1 to 5 exhibited high pressure loss and low strength compared with the honeycomb structures of Examples 1 to 3. Here, comparing Examples 1 to 3 with Comparative Examples 1 to 5, the aggregate main constituent and the bonding material main constituent are all the same constituents. The bonding material proportion (%) also indicates the same value. The thickness of partition wall (μm) and the porosity (%) are also the same values between Examples 1 to 3 and Comparative Examples 1 to 5. The difference between Examples 1 to 3 and Comparative Examples 1 to 5 is the "Number of Specific Refractory Aggregates" shown in Table 2. It is found that the number of specific refractory aggregates greatly affects the pressure loss and the strength of the honeycomb structure. In the case where the number of specific refractory aggregates is five pieces or more like the honeycomb structures of Examples 1 to 3, a bond neck portion, where the refractory aggregates are bonded to each other by the bonding material. It is accordingly inferred that this improves the strength of the porous body. Assume that, for example, the bonding material proportion (%) and the porosity of the partition wall (%) are the same in the case where the number of specific refractory aggregates is five pieces or more, pores formed in the porous body is likely to be communication holes. It is inferred that this reduces the pressure loss.

The honeycomb structure of the present invention can be used as a filter and a catalyst carrier for purifying vehicle exhaust gas.

DESCRIPTION OF REFERENCE NUMERALS

1, 31, 51: partition wall, 2, 32, 32a, 32b, 52, 52a, 52b: cell, 3, 33, 53: circumferential wall, 4, 34, 54: honeycomb structure body, 7: refractory aggregate, 8: bonding material, 9: pore, 10: porous body, 11, 41, 61: first end face (end face), 12, 42, 62: second end face (end face), 35, 55: plugging portion, 56: honeycomb segment, 57: bonding layer, 58: outer wall (outer wall of honeycomb segment), 100, 200, 300: honeycomb structure

What is claimed is:

1. A honeycomb structure, comprising:
a fired columnar honeycomb structure body that has partition walls, the partition walls defining a plurality of cells, the plurality of cells extending from a first end face to a second end face and becoming channels for fluid,
wherein each partition wall is constituted of a porous body, the porous body including a refractory aggregate and a bonding material, the bonding material having a main constituent of a metal oxide material, the bonding material bonding the refractory aggregate,
wherein the porous body constituting each partition wall includes the bonding material at a mass proportion of 20 to 35 mass %, and
in an observation of a cross section of the partition walls perpendicular to the cell extending direction of the columnar honeycomb structure body with an electron microscope, when observing any given ten visual fields meeting a following condition (1), the number of refractory aggregates meeting a following condition (2) is five pieces or more in all of the ten visual fields;

Condition (1): the visual field is 100 μm square, and in the visual field, a proportion of an area occupied by the bonding material to a total area of the refractory aggregate and the bonding material in the visual field is 30% or more, Condition (2): the refractory aggregate has a particle diameter of 5 μm or more, and 60% or more of an outer circumference of the refractory aggregate is surrounded by the bonding material.

2. The honeycomb structure according to claim 1,
wherein the bonding material has a main constituent of: a metal oxide of at least one kind of metal selected from the group consisting of Al, Si, and Mg; or a mixture of the oxides.

3. The honeycomb structure according to claim 2,
wherein in an observation of the cross section of the partition walls perpendicular to the cell extending direction of the honeycomb structure body with the electron microscope, when observing any given ten visual fields meeting the condition (1), the number of refractory aggregates meeting the condition (2) is seven or more.

4. The honeycomb structure according to claim 3,
wherein in an observation of a cross section of the partition walls perpendicular to the cell extending direction of the honeycomb structure body with an electron microscope, when observing any given ten visual fields meeting a following condition (3), the number of refractory aggregates meeting the condition (2) is five or more;

Condition (3): the visual field is 70 μm square, and in the visual field, a proportion of an area occupied by the bonding material to a total area of the refractory aggregate and the bonding material in the visual field is 30% or more.

5. The honeycomb structure according to claim 4,
wherein the refractory aggregate includes silicon carbide particles or silicon nitride particles.

6. The honeycomb structure according to claim 3,
wherein the refractory aggregate includes silicon carbide particles or silicon nitride particles.

7. The honeycomb structure according to claim 2,
wherein in an observation of a cross section of the partition walls perpendicular to the cell extending direction of the honeycomb structure body with an electron microscope, when observing any given ten visual fields meeting a following condition (3), the number of refractory aggregates meeting the condition (2) is five or more;

Condition (3): the visual field is 70 μm square, and in the visual field, a proportion of an area occupied by the bonding material to a total area of the refractory aggregate and the bonding material in the visual field is 30% or more.

8. The honeycomb structure according to claim 7,
wherein the refractory aggregate includes silicon carbide particles or silicon nitride particles.

9. The honeycomb structure according to claim 2,
wherein the refractory aggregate includes silicon carbide particles or silicon nitride particles.

10. The honeycomb structure according to claim 1,
wherein in an observation of the cross section of the partition walls perpendicular to the cell extending direction of the honeycomb structure body with the electron microscope, when observing any given ten visual fields meeting the condition (1), the number of refractory aggregates meeting the condition (2) is seven or more.

11. The honeycomb structure according to claim 10,
wherein in an observation of a cross section of the partition walls perpendicular to the cell extending direction of the honeycomb structure body with an electron microscope, when observing any given ten visual fields meeting a following condition (3), the number of refractory aggregates meeting the condition (2) is five pieces or more;

Condition (3): the visual field is 70 μM square, and in the visual field, a proportion of an area occupied by the bonding material to a total area of the refractory aggregate and the bonding material in the visual field is 30% or more.

12. The honeycomb structure according to claim 11,
wherein the refractory aggregate includes silicon carbide particles or silicon nitride particles.

13. The honeycomb structure according to claim 10,
wherein the refractory aggregate includes silicon carbide particles or silicon nitride particles.

14. The honeycomb structure according to claim 1,
wherein in an observation of a cross section of the partition walls perpendicular to the cell extending direction of the honeycomb structure body with an electron microscope, when observing any given ten visual fields meeting a following condition (3), the number of refractory aggregates meeting the condition (2) is five or more;

Condition (3): the visual field is 70 μm square, and in the visual field, a proportion of an area occupied by the bonding material to a total area of the refractory aggregate and the bonding material in the visual field is 30% or more.

15. The honeycomb structure according to claim 14,
wherein the refractory aggregate includes silicon carbide particles or silicon nitride particles.

16. The honeycomb structure according to claim 1,
wherein the refractory aggregate includes silicon carbide particles or silicon nitride particles.

* * * * *